US012319062B2

(12) United States Patent
Thelander et al.

(10) Patent No.: US 12,319,062 B2
(45) Date of Patent: *Jun. 3, 2025

(54) PRINTHEAD MODULE HAVING ALTERNATE PCBS AND ROWS OF PRINT CHIPS

(71) Applicant: Memjet® Technology Limited, Leopardstown (IE)

(72) Inventors: Jason Mark Thelander, North Ryde (AU); David Oliver Burke, North Ryde (AU)

(73) Assignee: Memjet Technology Limited, Dublin (IE)

( * ) Notice: Subject to any disclaimer, the term of this patent is extended or adjusted under 35 U.S.C. 154(b) by 102 days.

This patent is subject to a terminal disclaimer.

(21) Appl. No.: 18/339,907

(22) Filed: Jun. 22, 2023

(65) Prior Publication Data

US 2023/0330991 A1 Oct. 19, 2023

Related U.S. Application Data

(63) Continuation of application No. 17/744,028, filed on May 13, 2022, now Pat. No. 11,718,096, which is a continuation of application No. 17/017,333, filed on Sep. 10, 2020, now Pat. No. 11,358,391.

(60) Provisional application No. 63/023,370, filed on May 12, 2020, provisional application No. 62/900,356, filed on Sep. 13, 2019.

(51) Int. Cl.

*B41J 2/145* (2006.01)
*B41J 2/14* (2006.01)
*B41J 2/155* (2006.01)
*B41J 2/17* (2006.01)
*B41J 2/175* (2006.01)
*B41J 2/21* (2006.01)

(52) U.S. Cl.

CPC ................ *B41J 2/145* (2013.01); *B41J 2/14* (2013.01); *B41J 2/14209* (2013.01); *B41J 2/1433* (2013.01); *B41J 2/155* (2013.01); *B41J 2/17* (2013.01); *B41J 2/175* (2013.01); *B41J 2/2103* (2013.01); *B41J 2002/14491* (2013.01); *B41J 2202/13* (2013.01); *B41J 2202/20* (2013.01)

(58) Field of Classification Search

CPC . B41J 2/145; B41J 2/14; B41J 2/14209; B41J 2/1433; B41J 2/155; B41J 2/17; B41J 2/175; B41J 2/2103; B41J 2/04548; B41J 2/0457

See application file for complete search history.

(56) References Cited

U.S. PATENT DOCUMENTS 11,718,096 B2 * 8/2023 Thelander .................. B41J 2/14
347/49

* cited by examiner

*Primary Examiner* — Jason S Uhlenhake
(74) *Attorney, Agent, or Firm* — Cooley LLP

(57) ABSTRACT

A printhead module includes a monolithic substrate having longitudinal ink supply channels defined through a thickness of the substrate and extending parallel with each other along a length of the substrate; rows of print chips mounted on a front face of the substrate, each row of print chips receiving ink only from a respective one of the ink supply channels; and first PCBs mounted on the front face, each PCB extending alongside a respective one of the rows of print chips and supply power thereto. The rows of print chips and the first PCBs are mounted alternately across the front face of the substrate.

10 Claims, 9 Drawing Sheets

PRINTHEAD MODULE HAVING ALTERNATE PCBS AND ROWS OF PRINT CHIPS

CROSS-REFERENCE TO RELATED APPLICATIONS

The present application is a Continuation application of U.S. application Ser. No. 17/744,028, filed May 13, 2022, which is a Continuation application of U.S. application Ser. No. 17/017,333, filed Sep. 10, 2020, now Issued U.S. Pat. No. 11,358,391, which claims the benefit of priority to U.S. Provisional Application No. 62/900,356, filed Sep. 13, 2019, and to U.S. Provisional Application No. 63/023,370, filed May 12, 2020, the contents of which are incorporated herein by reference for all purposes.

FIELD OF THE INVENTION

This invention relates to an inkjet printhead. It has been developed primarily to provide a robust, full-color modular printhead suitable for high quality page wide printing.

BACKGROUND OF THE INVENTION

The Applicant has developed a range of Memjet® inkjet printers as described in, for example, WO2011/143700, WO2011/143699 and WO2009/089567, the contents of which are herein incorporated by reference. Memjet® printers employ one or more stationary inkjet printheads in combination with a feed mechanism which feeds print media past the printhead in a single pass. Memjet® printers therefore provide much higher printing speeds than conventional scanning inkjet printers.

Digital presses suitable for relatively short print runs represent a significant market opportunity for page wide printing technology. Page wide inkjet printing units may be used to replace traditional analogue printing plates in an offset press without significant modifications to expensive media feed systems. The present Applicant has developed printing systems suited to the needs of OEMs wishing to upgrade existing offset presses to high-speed digital inkjet presses. For example, U.S. Pat. No. 10,099,494 (incorporated herein by reference) describes a modular printing system comprising monochrome print bars having one or more print modules. Each print module has 5× redundancy by virtue of 5 nozzle rows in a respective printhead, providing high-quality, high-speed printing suited to the requirements of inkjet press OEMs. The modular printing system may be configured for full color printing by stacking monochrome print bars along a media feed path, as described in U.S. Pat. No. 10,099,494.

Notwithstanding these improvements in modular inkjet printing systems, there is still a need to improve such systems further. One disadvantage of using an array of monochrome print bars is that the overall print zone for full color printing is relative long. Even with innovative measures to minimize the inter-print bar separation, the print zone for four print bars (e.g., CMYK print bars) may still be 500 mm in length along the media feed path. Longer print zones create challenges, not only in terms of alignment and accurate dot-on-dot placement, but also integration into an existing offset media feed system. For example, limited space may be available for an inkjet print engine in the media feed path and reconfiguring media feed systems to accommodate such a print engine is costly for OEMs.

One approach to minimizing the size of the print zone to print four colors of ink from each printhead and stagger printheads across the print zone. One such printer is described in, for example, WO2011/011824. However, a problem with such printers is that each color channel has no redundancy, which inevitably impacts on speed and/or print quality. Accordingly, printers of this type are not usually suitable for use in digital ink presses.

It would therefore be desirable to provide a modular printing system suitable for digital inkjet presses, which has a print zone of minimal length along the media feed direction. It would be particularly desirable to provide such a printing system having sufficient redundancy for high quality, high-speed printing. Efficient arrangements for supplying ink, power and data to multiple closely packed print chips would also be desirable.

SUMMARY OF THE INVENTION

In a first aspect, there is provided a printhead module comprising a monolithic substrate having a plurality of rows of print chips mounted thereon, wherein each row of print chips receives power and data through a respective longitudinal slot defined through a thickness of the substrate, each longitudinal slot extending parallel with and offset from the rows of print chips.

The print module according to the first aspect advantageously provide an effective means for supplying power and data to multiple rows of print chips mounted on an ink manifold without complex multilayered substrates and wiring arrangements.

Preferably, the monolithic substrate has longitudinal ink supply channels defined therein, each ink supply channel extending parallel with the rows of print chips. Preferably, each one of the longitudinal ink supply channels is aligned with a respective one of the rows of print chips.

Preferably, the longitudinal slots are alternately arranged with the longitudinal ink supply channels in the monolithic substrate.

Preferably, fingers extend from opposite ends of the monolithic substrate, each finger containing a portion of a respective longitudinal ink supply channel and not a portion of any longitudinal slots.

Preferably, the monolithic substrate is comprised of a material selected from the group consisting of polymers, metal alloys and ceramics.

Preferably, each substrate has opposite first and second faces, the first face having one or more first PCBs mounted thereon and the second face having one or more second PCBs mounted thereon.

Preferably, the first and second PCBs are generally perpendicular to each other.

Preferably, the first and second PCBs are connected via electrical connectors extending through longitudinal slots defined in the substrate.

Preferably, the printhead module has a plurality of first PCBs, each row of print chips being electrically connected to a respective first PCB.

Preferably, each print chip is electrically connected to its respective first PCB via wire bonds.

Preferably, each second PCB comprises one or more external connectors selected from the group consisting of: a power connector and a data connector.

Preferably, each ink supply channel has a base defining a plurality of ink outlets and a roof comprising an elongate flexible film, and wherein each print chip receives ink from one or more of the ink outlets.

Preferably, the elongate flexible films are covered with a rigid cover.

In a related aspect, there is provided a modular inkjet printhead having a plurality of printhead modules, as described herein, arranged end-on-end.

In a second aspect, there is provided a printhead module comprising:

an ink manifold defining a plurality of ink supply channels, the ink manifold having first and second opposite faces;

a plurality of print chips mounted on the first face, each print chip receiving ink from a respective ink supply channel via a set of ink outlets defined in the first face;

a first PCB mounted on the first face of the ink manifold; each print chip being electrically connected to a respective first PCB;

a second PCB mounted on the second face of the ink manifold, wherein the opposite first and second PCBs are connected via electrical connectors extending through longitudinal slots defined in the substrate.

Preferably, the printhead module comprises a plurality of first PCBs.

Preferably, the printhead module comprises a plurality of rows of print chips, and wherein each first PCB is connected to a respective row of print chips.

Preferably, the first and second PCBs are each rigid PCBs.

In one embodiment, the second PCBs are perpendicular to the first PCBs. In another embodiment, the second PCBs are parallel to the first PCBs.

Preferably, each pair of neighboring ink supply channels has one of said longitudinal slots positioned therebetween.

Preferably, each ink supply channel has a base defining a plurality of said ink outlets and a roof comprising an elongate flexible film.

Preferably, each second PCB comprises one or more external connectors selected from the group consisting of: a power connector and a data connector.

Preferably, a plurality of parallel printhead segments extend longitudinally along a length of the substrate, each printhead segment comprising a plurality of said print chips arranged end on end in a row, each print chip in one row receiving ink from a respective one of the ink supply channels, and each print chip comprising a plurality of nozzle rows configured for redundant printing.

Preferably, fingers extend longitudinally from opposite ends of the printhead module; each finger comprises a portion of a respective one of the printhead segments; and the fingers of neighboring printhead modules are interdigitated such that printhead segments of neighboring printhead modules overlap.

Preferably, a number of fingers is twice a number of printhead segments.

In a third aspect, there is provided a modular inkjet printhead comprising:

a plurality of printhead modules arranged end on end in a row;

an elongate support structure extending a length of the printhead for holding the printhead modules;

an ink carrier extending alongside the support structure and laterally spaced from the printhead modules, the ink carrier being fluidically connected to each of the printhead modules via a plurality of ink connectors extending laterally therefrom;

a pair of elongate busbars extending longitudinally along a roof of the ink carrier, each busbar being electrically connected to each of the printhead modules via a pair of respective connector straps extending transversely therefrom, the busbars suppling power to each of the printhead modules.

The printhead according to the third aspect advantageously integrates supply of power and ink to a plurality of printhead modules from one side of the printhead.

Preferably, each printhead module has at least one PCB extending upwardly therefrom for supplying power to a plurality of print chips of the printhead module.

Preferably, respective connector straps are electrically connected to respective PCBs.

Preferably, each printhead module includes a PCB housing containing the PCB, and wherein the connector straps extend in a horizontal plane from the busbars towards a roof of each PCB housing.

Preferably, the ink carrier comprises inlet and outlet ink lines.

Preferably, each printhead modules has an ink inlet port at one end and an ink outlet port at an opposite end, the ink inlet and outlet ports being connected to the inlet and outlet ink lines respectively.

Preferably, the printhead modules comprise a plurality of fingers at each end thereof, and wherein the fingers of neighboring printhead modules are interdigitated.

Preferably, the elongate support structure comprises a U-channel having a base configured for receiving the printhead modules.

Preferably, the base defines at least one opening for complementarily receiving the printhead modules.

Preferably, the U-channel has an elongate flange extending laterally outwards from a sidewall thereof, the elongate flange supporting the ink carrier.

Preferably, each printhead module comprises a plurality of rows of print chips, each row of print chips being configured for printing a different colored ink.

Preferably, each printhead module comprises four row of print chips for printing cyan, magenta, yellow and black inks respectively.

It will of course be appreciated that preferred embodiments described in connection with one aspect may be, where relevant, be equally applicable to other aspects.

As used herein, the term “ink” is taken to mean any printing fluid, which may be printed from an inkjet printhead. The ink may or may not contain a colorant. Accordingly, the term “ink” may include conventional dye-based and pigment-based inks, infrared inks, UV inks, fixatives (e.g., pre-coats and finishers), functional fluids (e.g. solar inks, sensing inks etc.), 3D printing fluids, biological fluids and the like. Where reference is made to fluids or printing fluids, this is not intended to limit the meaning of “ink” herein.

As used herein, the term “mounted” includes both direct mounting and indirect mounting via an intervening part.

BRIEF DESCRIPTION OF THE DRAWINGS

Embodiments of the present invention will now be described by way of example only with reference to the accompanying drawings, in which.

DETAILED DESCRIPTION OF THE INVENTION

First Embodiment

Figure 1:
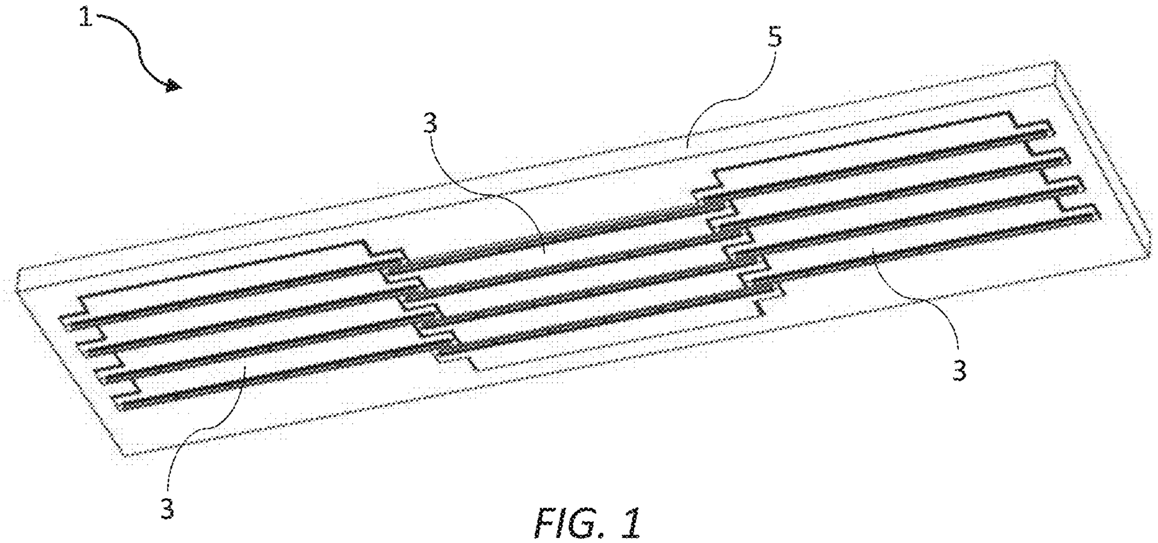
FIG. 1 is a front perspective of a modular inkjet printhead according to a first embodiment.
Figure 2:
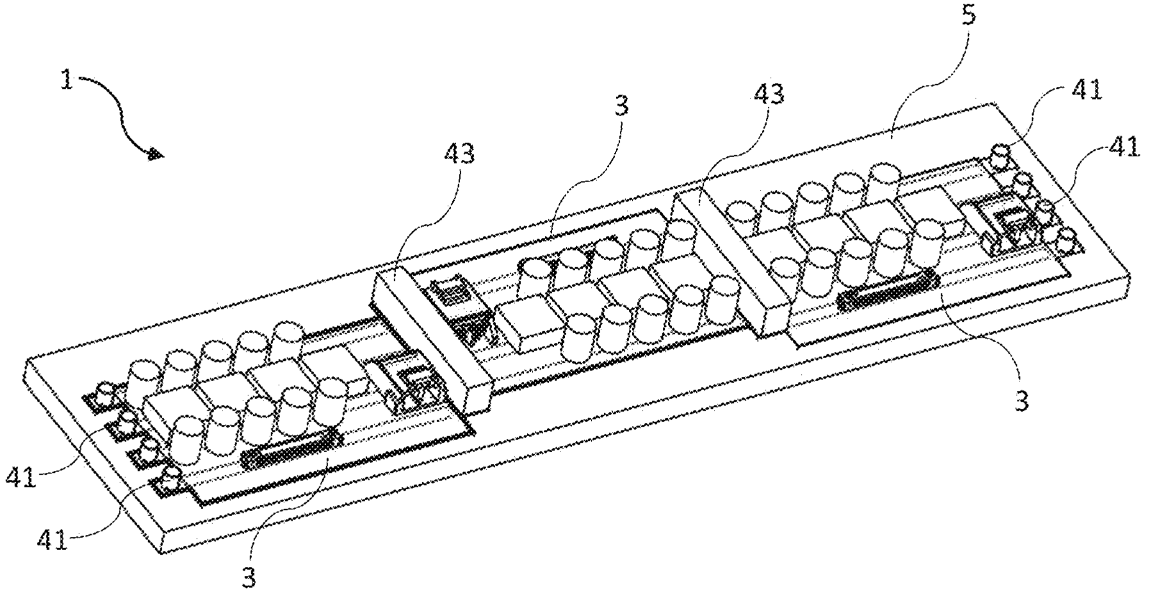
FIG. 2 is a rear perspective of the printhead shown in FIG. 1.
Figure 3:
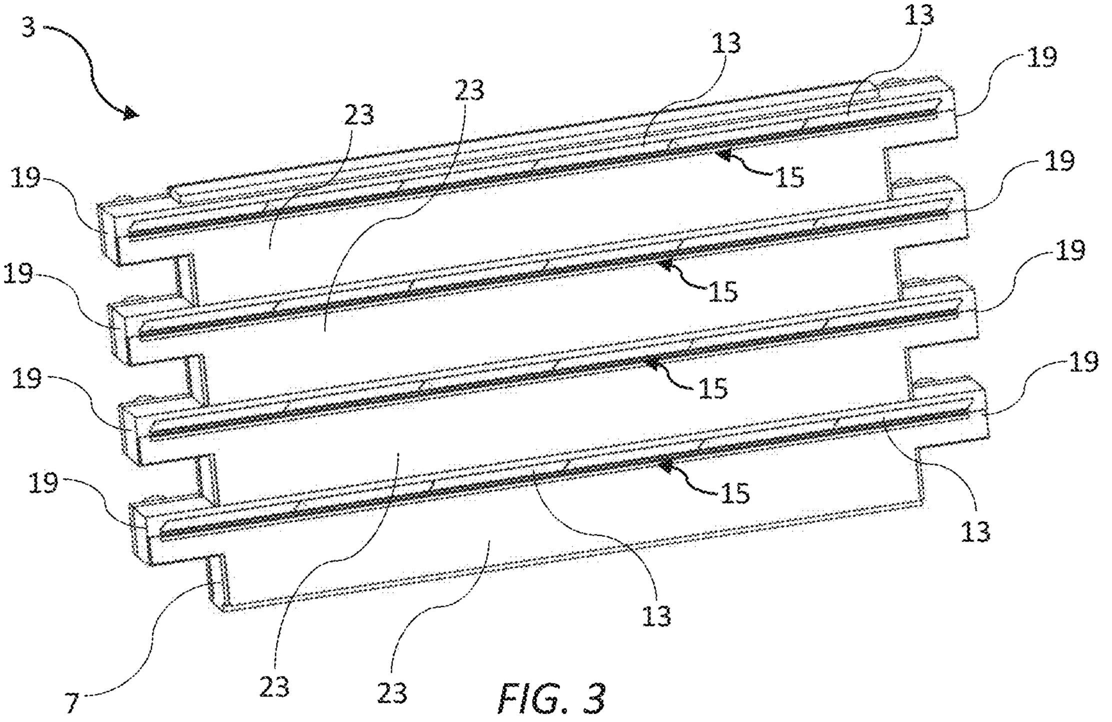
FIG. 3 is a front perspective of an individual printhead module according to a first embodiment.

Referring to FIGS. 1 and 2, there is shown a modular inkjet printhead 1 (or "print bar") according to a first embodiment of the invention. The printhead 1 comprises a plurality of printhead modules 3 arranged end on end and mounted to a complementary support structure 5. Typically, the support structure 5 has one or more openings configured for complementarily receiving the printhead modules 3. Although three printhead modules 3 are shown in the embodiment of FIGS. 1 and 2, it will be appreciated that the printhead 1 may contain a greater or fewer number of printhead modules (e.g., 1 to 20 printhead modules) to construct a page wide print bar of any required length.

FIGS. 3 to 7 show an individual printhead module 3 according to the first embodiment. Each printhead module 3 comprises a substrate 7 in the form an elongate ink manifold having four parallel ink supply channels 9 extending longitudinally along a length thereof. The ink supply channels 9 are defined in a backside face of the substrate 7 and a plurality of ink outlets 11 are defined in a base of each ink supply channel. The ink outlets 11 supply ink from a respective ink supply channel 9 to a plurality of print chips 13 mounted in a row along a respective frontside chip mounting surface 12 of the substrate 7. The four rows of print chips 13 are aligned with the four rows of ink supply channels 9, typically for printing CMYK inks. Each row of print chips 13 in one printhead module 3 defines a printhead segment 15 of the printhead, with each printhead segment containing six print chips butted end on end in a row. Print chips configured for butting end on end in a page wide arrangement will be known to the person skilled in the art. For example, the Applicant's dropped nozzle triangle architecture for linking print chips in a row is described in U.S. Pat. No. 7,290,852, the contents of which are herein incorporated by reference.

Of course, the number of printhead segments 15 in each printhead module 3 may be fewer or greater than four, depending on the application. For example, a printhead module 3 may have up to ten printhead segments for printing additional spot colors (e.g., orange, violet, green, khaki, etc.), UV inks, IR inks and/or a fixative fluid. Likewise, each printhead segment 15 may contain fewer or greater than six print chips (e.g., 2 to 15 print chips).

Figure 7:
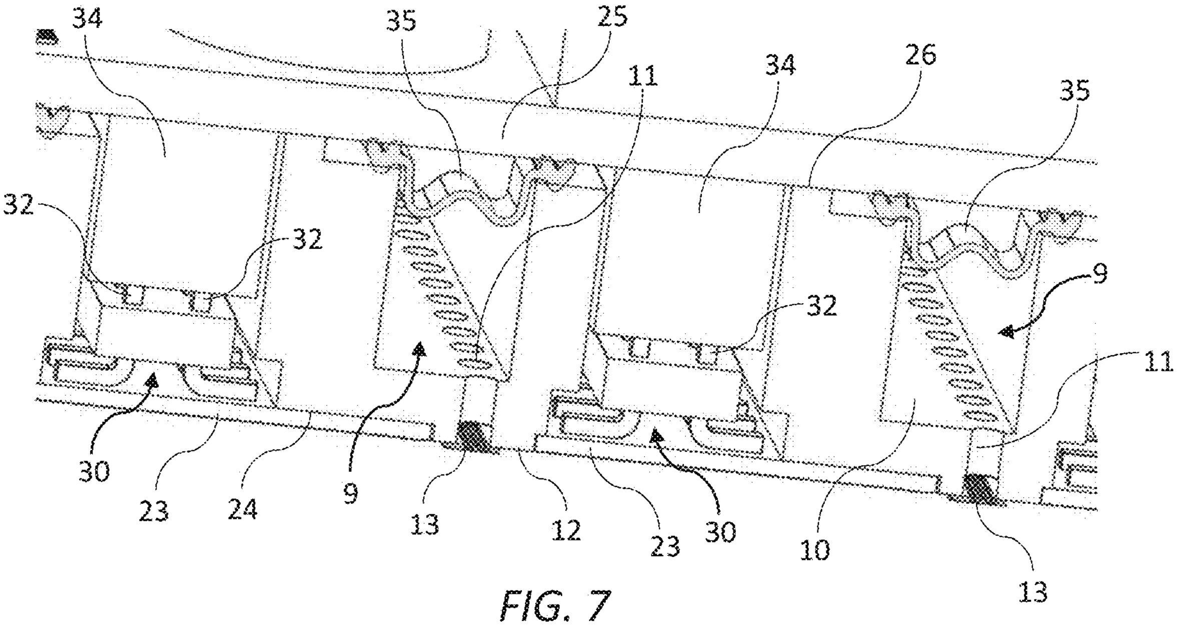
FIG. 7 is a magnified sectional perspective of the printhead module according to the first embodiment.
Figure 8:
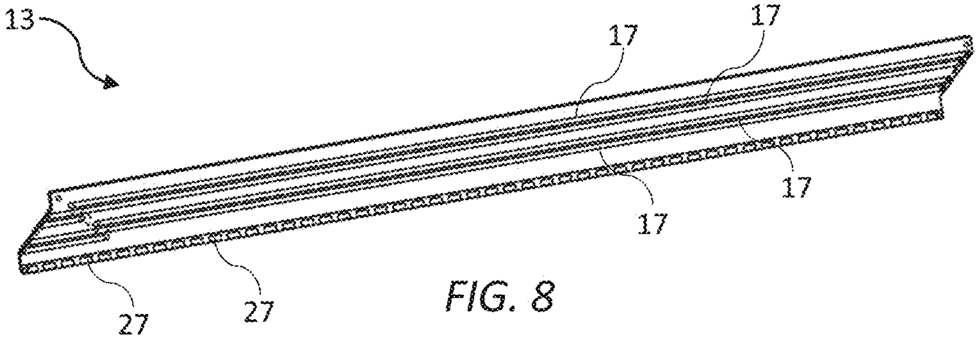
FIG. 8 is a perspective of an individual print chip.

As best shown in FIG. 7, each print chip 13 is fed with ink from a respective one of the ink supply channels 9 and configured for monochrome printing. Each print chip 13 has a plurality of nozzle rows 17 (e.g., 2 to 10 nozzle rows) for redundant monochrome printing. In other words, nozzles are available for printing each pixel position for a given ink, providing improved speed and/or print quality. FIG. 8 shows a print chip 13 in isolation have four nozzle rows 17 providing 4× redundancy. Memjet® print chips having five nozzle rows, providing 5× redundancy, are equally suitable for use in the printhead module 3.

The printhead modules 3 therefore provide the significant advantage of multiple-redundant full-color printing across a relatively narrow print zone. Typically, the print zone of the printhead 1 has a dimension of less than 200 mm, less than 100 mm or less than 80 mm in a media feed direction—that is, transverse to the longitudinal axes of the printhead segments 15 and print chips 13.

Figure 9:
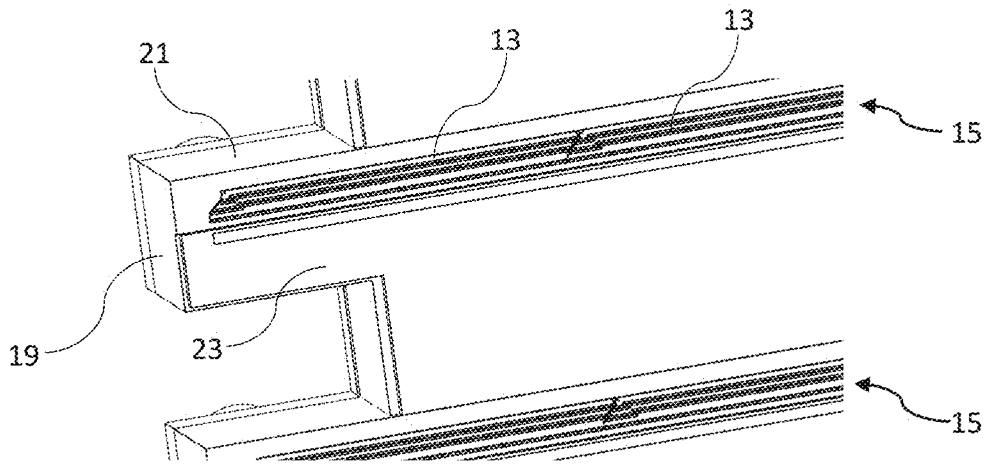
FIG. 9 is a magnified perspective of a finger extending from one end of the printhead module according to the first embodiment.
Figure 10:
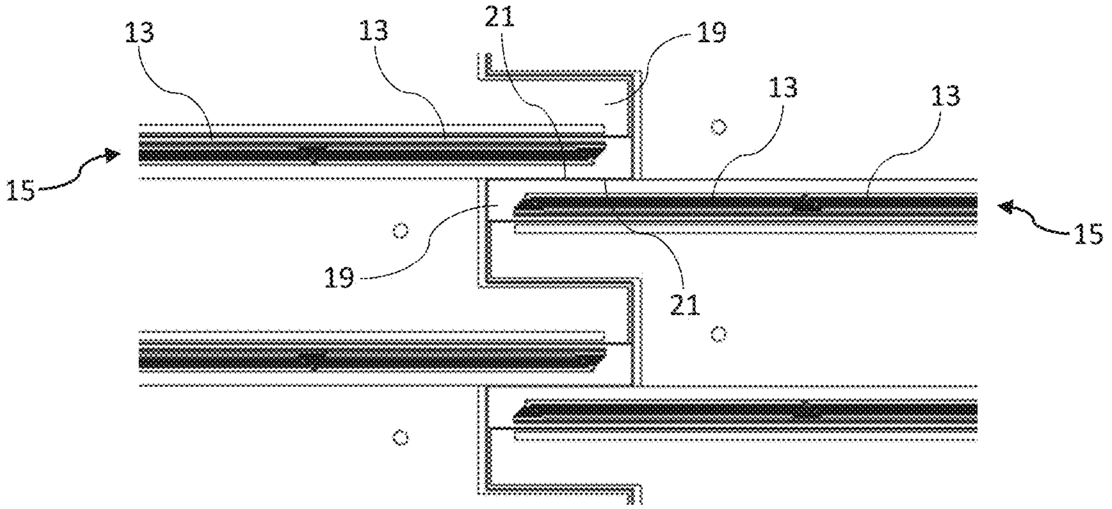
FIG. 10 is a magnified plan view of a pair of interdigitated fingers according to the first embodiment.
Figure 11:
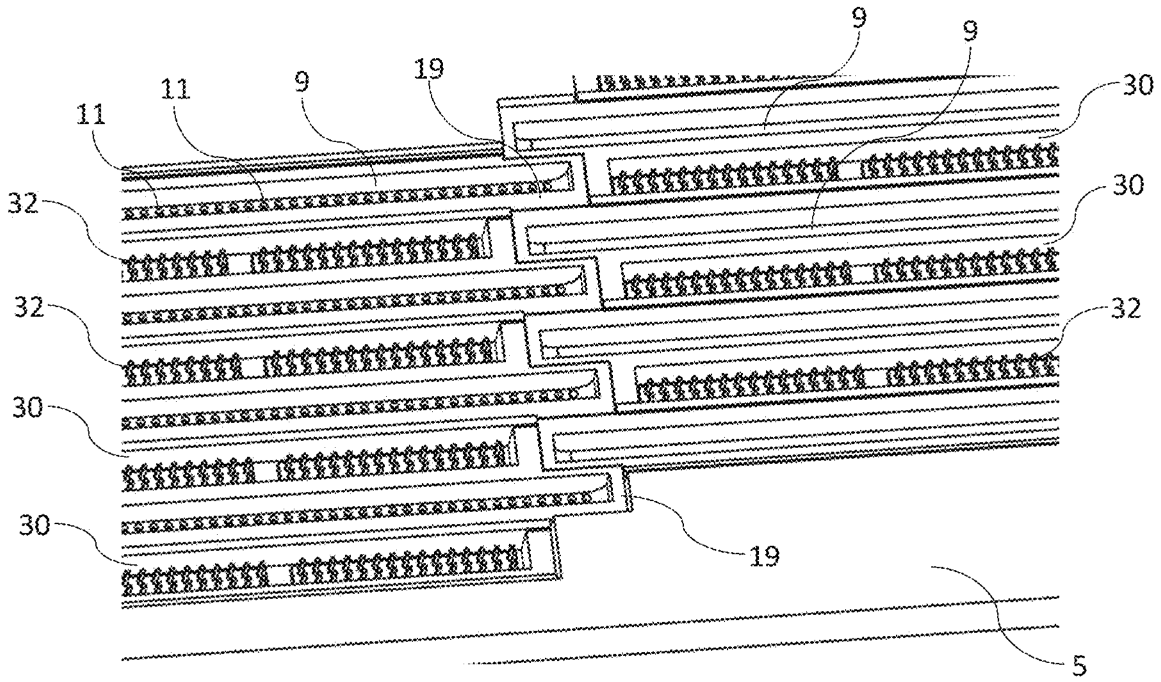
FIG. 11 is a rear perspective of a pair of nested printhead modules according to the first embodiment.

In the printhead 1, the printhead modules 3 are nested together via interdigitated fingers 19 longitudinally extending from opposite ends of each printhead module. In the embodiment shown, four fingers 19 at each end of one printhead module 3 correspond to the four printhead segments 15 in the printhead module, such that the total number of fingers at both ends is twice the number of printhead segments in each printhead module. As best shown in FIG. 9, each finger 19 contains a portion of one of the printhead segments 15, such that printhead segments of neighboring printhead modules 3 overlap across the interdigitated fingers in the printhead 1. FIGS. 10 and 11 show the overlap region for a pair of neighboring printhead modules 3.

Although all printhead modules are identical, in the page wide printhead 1 according to the first embodiment each alternate printhead module (i.e. the central printhead module in FIGS. 1 and 2) is oriented in an opposite direction with respect to a media feed direction. Referring now to FIGS. 9 and 10, the print chip 13 contained in each finger 19 is positioned towards one lateral edge 21 of the finger. As a consequence of this offset arrangement and the alternately oriented printhead modules 3, a distance between overlapping print chips 13 in the same color channel is minimized By minimizing the separation of corresponding printhead segments 15 in the overlap region shown in FIG. 10, improved alignment and print quality is achieved in the overlap regions. (In the present context, "corresponding printhead segments" are printhead segments which print a same ink in a same line of print). Typically, the distance between overlapping print chips 13 from corresponding printhead segments 15 is less than 20 mm, less than 10 mm or less than 6 mm.

Figure 5:
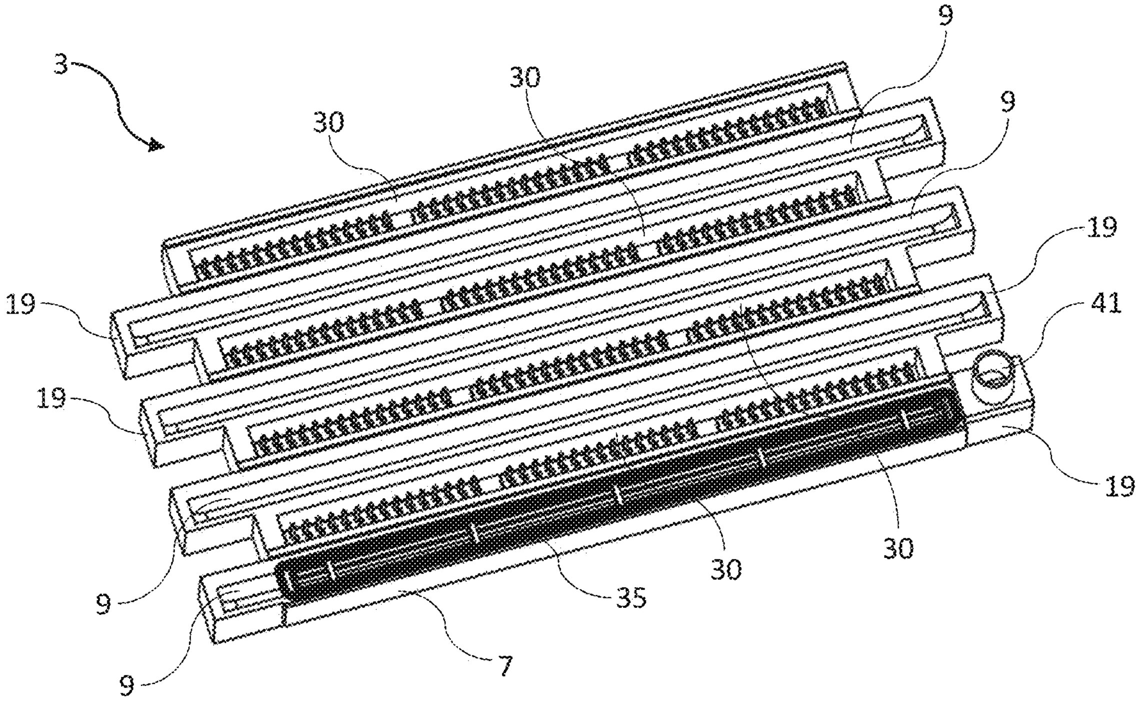
FIG. 5 is a rear perspective of the printhead according to the first embodiment with various components removed to reveal longitudinal ink supply channels.

In order to supply power and data to the print chips 13, the printhead module 3 according to the first embodiment has opposite first and second rigid PCBs 23 and 25 mounted parallel to each other on respective frontside and backside faces 24 and 26 of the substrate 7. Four first PCBs 23 correspond to the four printhead segments 15, with each first PCB being positioned alongside a respective row of print chips 13. Each print chip 13 in one printhead segment 15 has bond pads 27 connected to its respective first PCB 23 via wire bonds (not shown). The four first PCBs 23 are connected to the second PCB 25 mounted on the backside face 26 of the substrate via electrical connectors extending through longitudinal slots 30 defined through a thickness of the substrate. In the printhead module 3 according to the first embodiment, the electrical connectors take the form of pin connectors 32 extending from each first PCB 23 engaged with complementary sockets 34 extending from the second PCB. The longitudinal slots 30 accommodating these electrical connections are alternately positioned alongside the longitudinal ink supply channels 9, such that each pair of neighboring ink supply channels has one of the longitudinal slots positioned therebetween. As best seen in FIG. 5, the ink supply channels 9 extend into the fingers 19 at each end of the printhead module 3 for supply of ink to the endmost print chips 13; however, the longitudinal slots 30 accommodating the electrical connections are relatively shorter than the ink supply channels 9 and do not extend into the fingers 19. Therefore, the print chips 13 positioned in the fingers 19 receive data and power from the pin connectors 32 routed via the first PCBs 23, which extend into the fingers.

The alternating arrangement of longitudinal slots 30 and ink supply channels 9 simplifies routing of ink and electrical wiring through the substrate 7. Therefore, the substrate 7 may be formed as a monolithic component. For example, the substrate 7 may be formed of a molded polymer (e.g., liquid crystal polymer), a ceramic material or a die-cast metal alloy (e.g., Invar).

Figure 6:
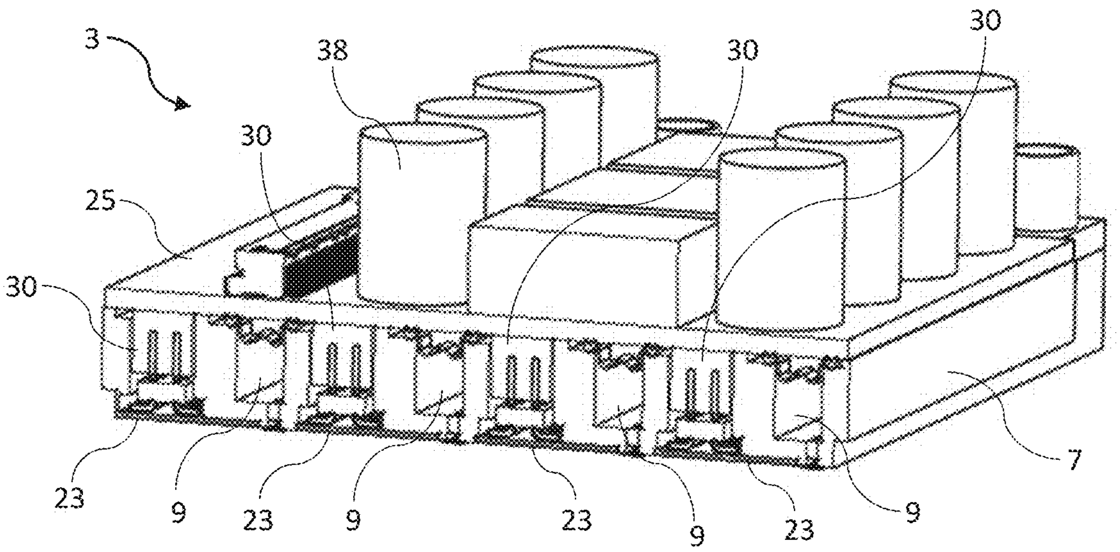
FIG. 6 is a sectional perspective of the printhead module according to the first embodiment.

As foreshadowed above, each ink supply channel 9 has a base 10 defining a plurality of ink outlets 11, with each print chip 13 receiving ink from a set of ink outlets. As best shown in FIGS. 6 and 7, an elongate flexible film 35 seals across a roof of each ink supply channel 9 for the purpose of dampening ink pressure fluctuations. A more detailed explanation of the form and function of the flexible film 35 can be found in U.S. Pat. No. 10,343,402, the contents of which are herein incorporated by reference.

Figure 4:
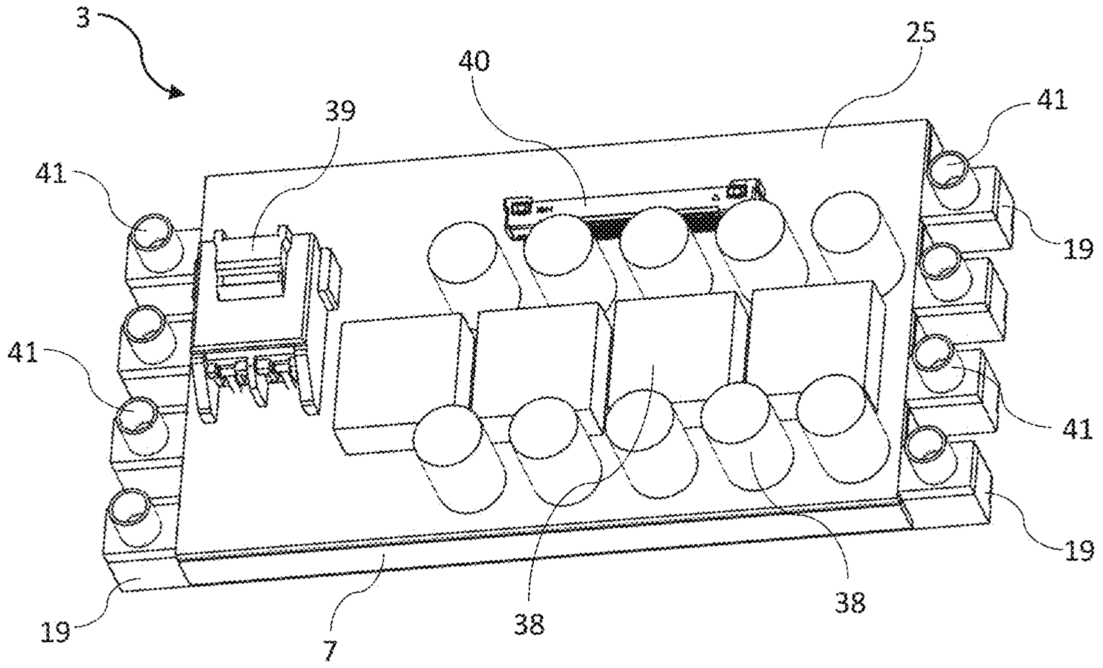
FIG. 4 is a rear perspective of the printhead module shown in FIG. 3.

In the printhead module 3 according to the first embodiment, the second PCB 25 covers the four elongate flexible films 35 of the four ink supply channels 9 and may be provided with vent holes (not shown) to allow flexing of the films, as required. Referring briefly to FIG. 4, an external face of the second PCB opposite the substrate 7 has several electrical components 38 mounted thereon, including a power connector 39 and a data connector 40 for receiving external power and data, which are supplied to the print chips 13 via the first PCBs 23.

Each ink supply channel 9 has a corresponding pair of ink ports 41 positioned in respective fingers 19 of the substrate 7 at opposite ends of the ink supply channel. The ink ports 41 are in the form of spouts extending away from a backside face of the printhead module 3 perpendicular to a plane of the substrate 7. Typically, ink is recirculated through the ink supply channels 9 such that an ink port 41 at one end of the printhead module 3 is an inlet port and an ink port at an opposite end is an outlet port. The ink supply channels 9 of each printhead module 3 may be supplied with ink individually via the ink ports 41. Alternatively, a set of printhead modules 3, or all printhead modules in the printhead 1, may have corresponding ink supply channels 9 serially connected via the ink ports 41.

Figure 12:
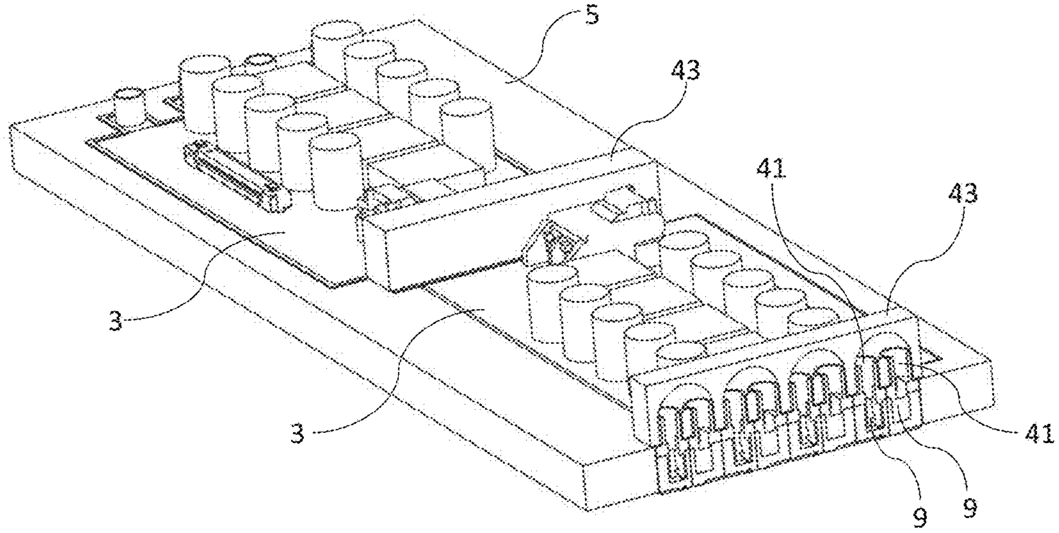
FIG. 12 is a sectional perspective of the printhead according to the first embodiment showing a linking manifold.

As shown in FIG. 12, the ink ports 41 of neighboring printhead modules 3 are transversely aligned across the printhead and adjacent ink ports for corresponding printhead segments 15 are interconnected. In the embodiment shown, a linking manifold 43 across the printhead 1 is conveniently employed to fluidically connect corresponding aligned ink ports 41. Other connectors (e.g., a set of individual U-pipes) may be similarly employed to provide serial fluidic connections.

Second Embodiment

Figure 13:
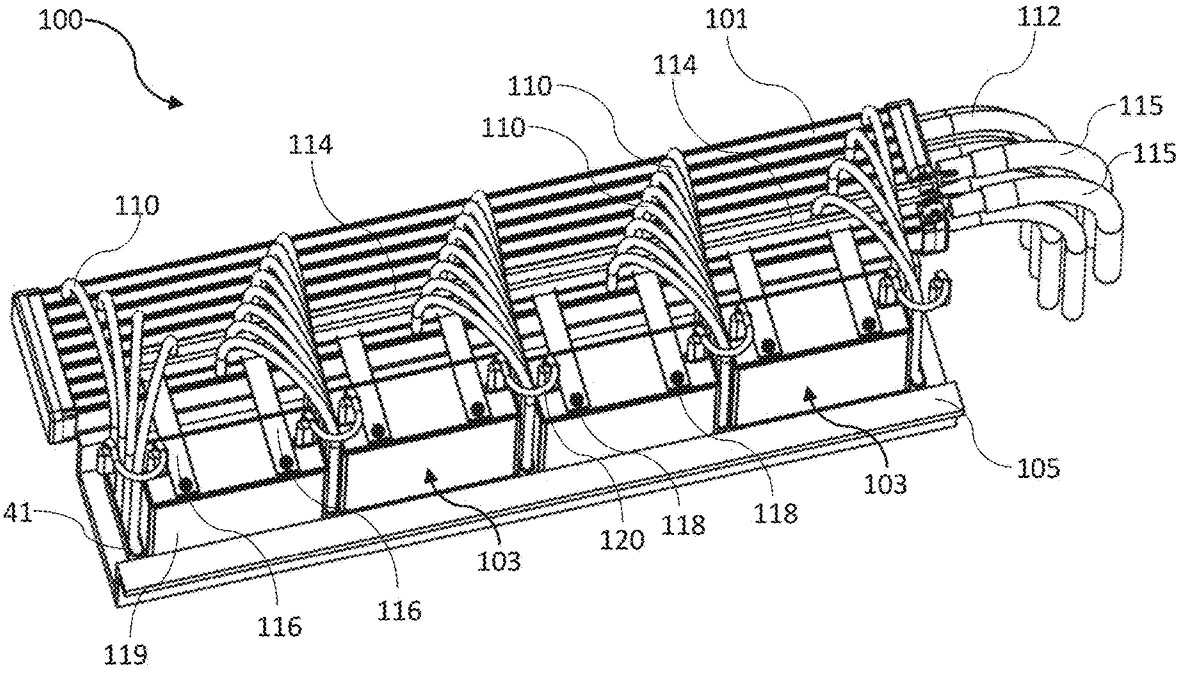
FIG. 13 is a front perspective of a modular inkjet printhead according to a second embodiment.
Figure 14:
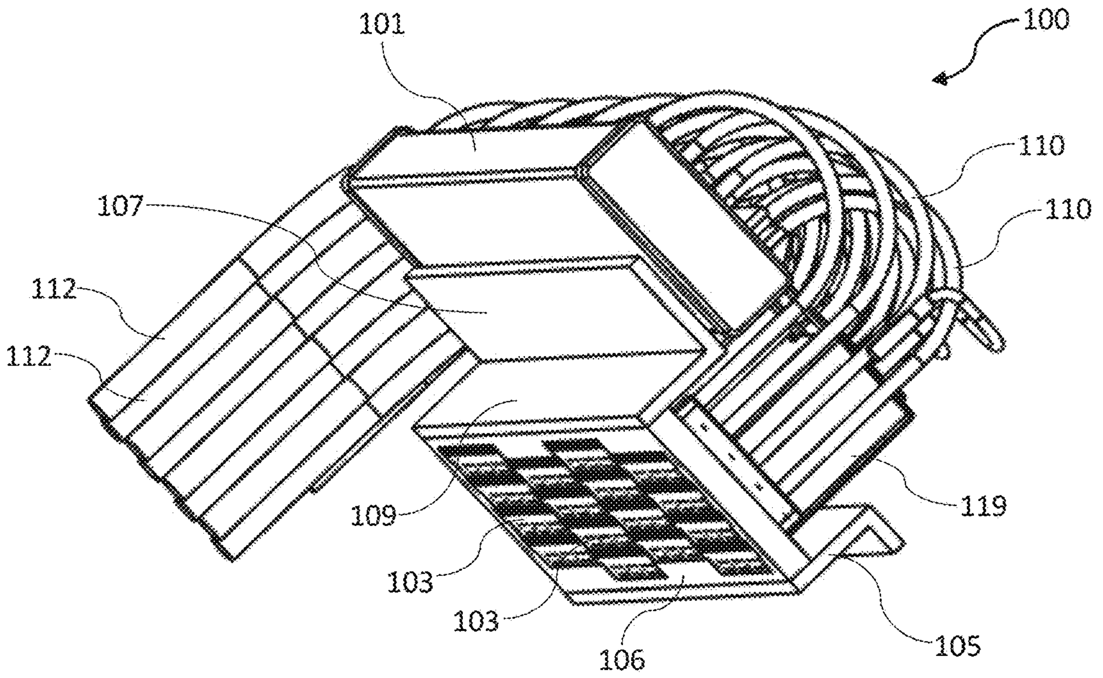
FIG. 14 is a side perspective of the printhead shown in FIG. 13.

Referring to FIGS. 13 and 14, there is shown a modular inkjet printhead 100 (or "print bar") according to a second embodiment of the invention. Where relevant, like features in the first and second embodiments are identified with like reference numerals.

The printhead 100 according to the second embodiment comprises four printhead modules 103 arranged end on end and mounted on a complementary support structure, which takes the form a U-channel 105. The U-channel has a base 106 having one or more openings configured for complementarily receiving the printhead modules 103 and, as described above, the number of printhead modules may be varied to construct a page wide array of any required length.

In contrast with the printhead 1 according to the first embodiment, the printhead 100 according to the second embodiment is supplied with ink from an elongate ink carrier 101, which take the form of a beam member extending alongside the line of printhead modules 103 and parallel with a longitudinal axis of the printhead. The ink carrier 101 is supported by a flange 107, which extends laterally outwardly from a sidewall 109 of the U-channel 105. Ink pipes 110 extend laterally from the ink carrier 101 towards the printhead modules 103 to connect with the ink ports 41, while the ink carrier receives and returns ink from an ink reservoir (not shown) via ink tubes 112 connected at one end of the ink carrier. Thus, each printhead module 103 is individually supplied with and returns four colors of ink to the ink carrier 101. The ink carrier 101 contains common ink inlet and outlet lines for each of the four colors.

Still referring to FIG. 13, a pair of busbars 114 (power and ground) extend longitudinally along the roof of the ink carrier 101 for supplying power to the plurality of printhead modules 103. The busbars 114 are connected to power cables 115 at a same end of the ink carrier 101 as the ink tubes 112. With power cables 115 and ink tubes 112 extending from one longitudinal end of the printhead assembly, the footprint of the assembly is advantageously minimized in the media feed direction.

Pairs of connector straps 116 extend transversely in a horizontal plane from the busbars 114 to provide power to individual printhead modules 103. The connector straps 116 are electrically connected to each printhead module 103 via power contacts 118 positioned on the roof of a PCB housing 119, which houses multiple PCBs supplying power and data to the print chips 13. The printhead modules 103 are linked via daisy chained data connectors 120, which may provide, for example, a timing signal and/or print data from a controller (not shown) to each of the printhead modules. Alternatively, the print modules 103 may receive data individually in parallel from a controller.

Figure 15:
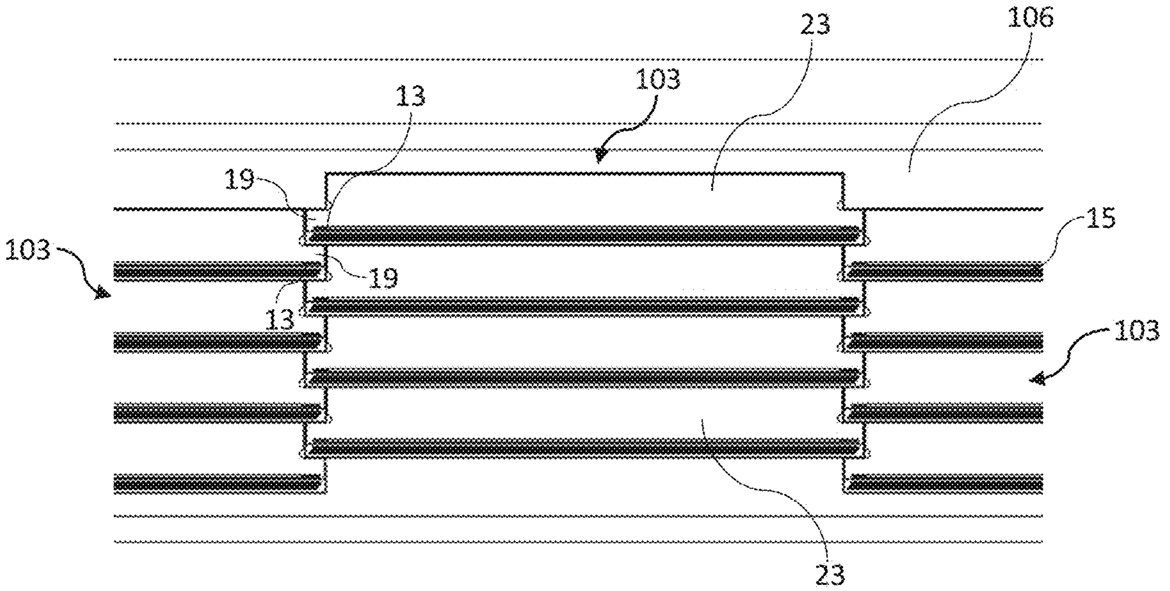
FIG. 15 is a plan view of neighboring printhead modules according to the second embodiment.

As shown in FIG. 15, neighboring printhead modules 103 in the printhead 100 have interdigitated fingers 19 to provide close spacing between overlapping print chips 13 of the neighboring modules. However, in contrast with the printhead 1 according to the first embodiment, the printhead 100 according to the second embodiment has all printhead modules 103 oriented in a same direction with respect to the direction of media travel. With all printhead modules 103 similarly oriented and equal spacing of print chips in the overlap region, the data processing requirements of the printhead 100 according to the second embodiment are simplified compared to the printhead 1 according to the first embodiment.

Figure 16:
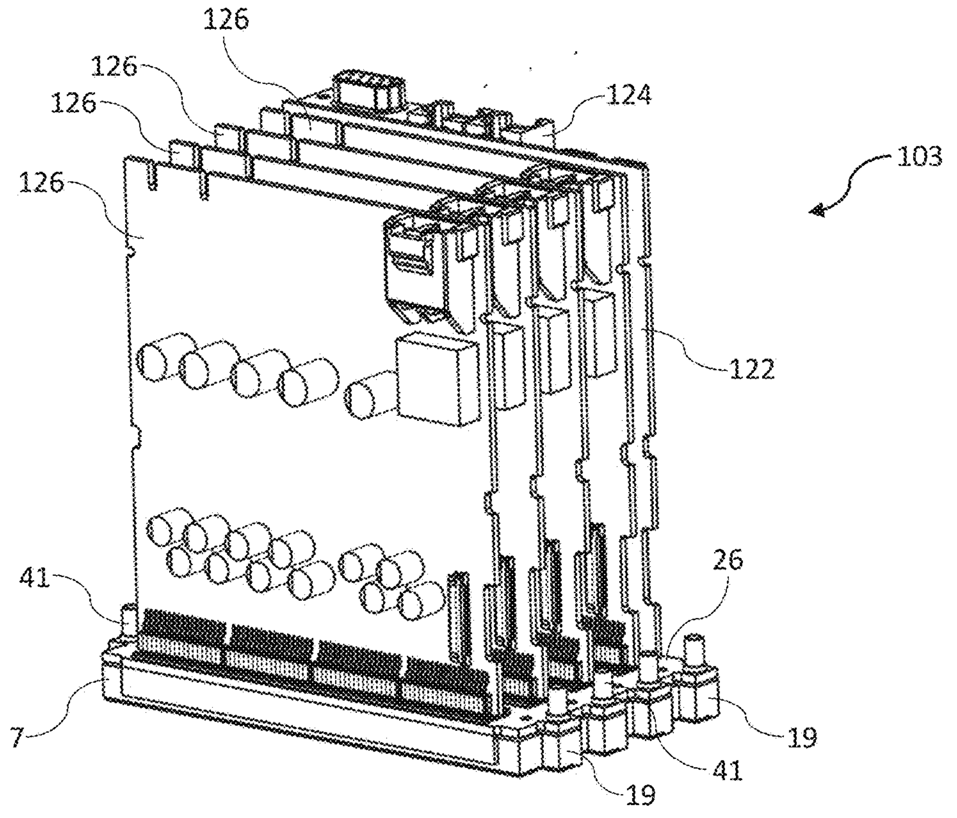
FIG. 16 is a perspective of a printhead module according to the second embodiment with backside PCBs.

Turning now to FIG. 16, there is shown an individual printhead module 103 according to the second embodiment with the PCB housing 119 removed. The printhead module 103 is similar in structure to the printhead module 3 according to the first embodiment. Accordingly, each printhead module 103 according to the second embodiment comprises the substrate 7 in the form an elongate ink manifold having the four parallel ink supply channels 9 extending longitudinally along a length thereof and interspersed with longitudinal slots 30 receiving electrical connectors, which interconnect PCBs on the frontside and backside of the substrate. (see FIG. 6).

To supply power and data to the print chips 13 in the printhead module 103 according to the second embodiment, five separate PCBs are mounted on the backside face 26 of the substrate 7 and extend perpendicularly with the respect to a plane of the first PCBs 23 mounted on the frontside face 24. The rearmost PCB shown in FIG. 16 is a data PCB 122, which receives data from a controller (not shown) via a respective data port 124. The other four PCBs are power PCBs 126, which are electrically connected to a respective pair of connection straps 116 via the power contacts 118 on the roof of the PCB housing 119. The data PCB 122 distributes print data to the power PCBs 126 via, for example, ribbon connectors (not shown) and the four power PCBs are connected to respective first PCBs 23 via electrical connectors extending through the longitudinal slots 30 defined through a thickness of the substrate 7 (similar to the printhead module 3 shown in FIGS. 6 and 7 according to the first embodiment).

As shown in FIG. 13, the four power PCBs 126 and the data PCB 122 of each printhead module 103 are contained in a respective PCB housing 119, which may incorporate a cooling fan (not shown) to extract heat from the printhead 100. The separation and perpendicular orientation of the power PCBs 126 assists in dissipating heat away from the substrate 7.

Figure 17:
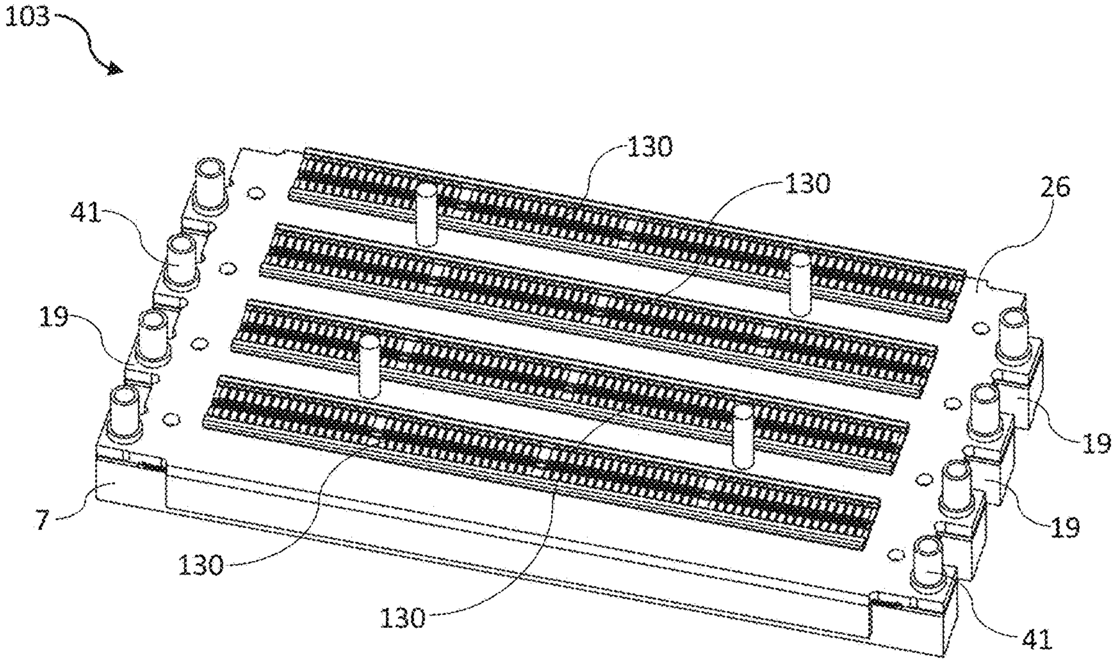
FIG. 17 is a perspective of the printhead module shown in FIG. 16 with backside PCBs removed.
Figure 18:
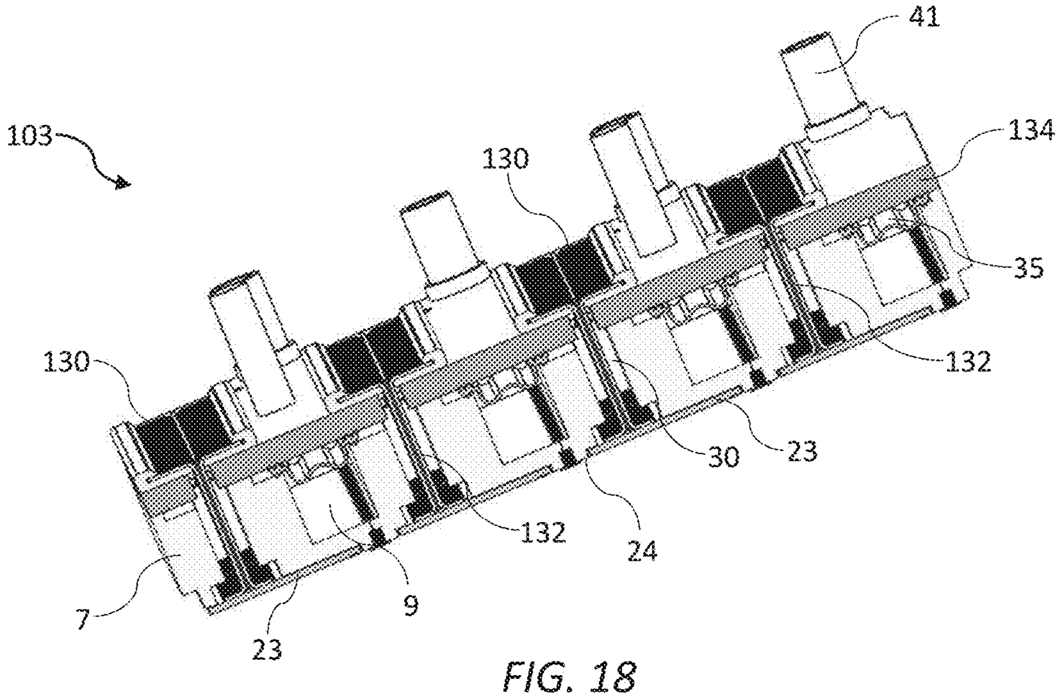
FIG. 18 is a sectional perspective of the printhead module shown in FIG. 17.

FIGS. 17 and 18 show the printhead module 103 with the PCBs removed to reveal four rows of module contacts 130 on the backside face 26 of the printhead module, which connect to the four power PCBs 126. In the printhead module 103 according to the second embodiment, the electrical connectors through the substrate 7 take the form of lead frames 132, which are connected to the four first PCBs 23 at the frontside face 24 of the substrate. The backside face of the substrate 7 is covered with a cover plate 134, which seals over the substrate and protects the four elongate flexible films 35 of the four ink supply channels 9.

From the foregoing, the skilled person will readily understand that the printheads 1 and 100 are highly suitable for use in digital inkjet presses, as well as certain desktop applications, where high-speed, high quality redundant printing is desired. In particular, the minimal length of the print zone in the media feed direction, redundancy within each color plane, and excellent alignment of printhead modules within a single complementary support structure advantageously enables such printheads to be used in a range of applications.

It will, of course, be appreciated that the present invention has been described by way of example only and that modifications of detail may be made within the scope of the invention, which is defined in the accompanying claims.

The invention claimed is:

1. A printhead module, comprising:

a monolithic substrate having a plurality of longitudinal ink supply channels defined through a thickness of the substrate and extending parallel with each other along a length of the substrate;

a plurality of rows of print chips mounted on a front face of the substrate, each row of print chips receiving ink only from a respective one of the ink supply channels; and a plurality of first PCBs mounted on the front face, each PCB extending alongside a respective one of the rows of print chips and supply power thereto, wherein the plurality of rows of print chips and the plurality of first PCBs are mounted alternately across the front face of the substrate.

2. The printhead module of claim 1, wherein longitudinal slots are defined through the thickness of the substrate, the longitudinal slots extending parallel with the longitudinal ink supply channels along the length of the substrate.

3. The printhead module of claim 2, wherein the longitudinal slots and the longitudinal ink supply channels are arranged alternately.

4. The printhead module of claim 3, wherein second PCBs are mounted on a back face of the substrate.

5. The printhead module of claim 4, wherein the second PCBs extend perpendicularly away from the back face of the substrate.

6. The printhead module of claim 4, wherein the first and second PCBs are connected via electrical connectors extending through the longitudinal slots defined through the thickness of the substrate.

7. The printhead module of claim 1, wherein the front face of the substrate defines rows of ink outlets, each row of ink outlets supplying ink only to a respective one of the rows of print chips, and each row of ink outlets receiving ink only from a respective one of the ink supply channels.

8. The printhead module of claim 7, wherein each one of the longitudinal ink supply channels is aligned with a respective one of the rows of print chips and ink outlets.

9. The printhead module of claim 1, wherein the monolithic substrate is comprised of a material selected from polymers, metal alloys and ceramics.

10. The printhead module of claim 1, wherein at least one end of the monolithic substrate is configured for interdigitating engagement with another like printhead module.

* * * * *